United States Patent [19]
Wloszek

[11] 3,824,883
[45] July 23, 1974

[54] CUTTING HEAD ASSEMBLY

[75] Inventor: Joseph T. Wloszek, Seven Hills, Ohio

[73] Assignee: Custom Machines, Inc., Cleveland, Ohio

[22] Filed: Feb. 8, 1973

[21] Appl. No.: 330,487

Related U.S. Application Data

[63] Continuation of Ser. No. 102,360, Dec. 29, 1970, abandoned.

[52] U.S. Cl. .................................................. 82/1.2
[51] Int. Cl. ............................................. B23b 3/26
[58] Field of Search ................ 82/2 E, 1.2; 408/152

[56] References Cited
UNITED STATES PATENTS
2,486,977  11/1949  Peters ..................................... 82/2 E
3,489,062   1/1970  Greenberg et al. ..................... 82/2 E Primary Examiner—Leonidas Vlachos
Attorney, Agent, or Firm—Meyer, Tilberry & Body

[57] ABSTRACT

A cutting head assembly especially suited for use on lathes or boring mills for performing facing operations. The cutting head assembly includes a tool carrier in the form of a generally cylindrical body adapted to be mounted on the end face of a conventional spindle with its axis aligned with the axis of rotation of the spindle. A pair of cutters are mounted on slide members carried in a slideway formed transversely in the outer end face of the body. The slides are arranged for movement along parallel chordal lines equally spaced from the axis of the body and are interconnected through rack gears and a pinion gear so that they move simultaneously an equal amount in opposite directions. Hydraulic piston units are carried in the body and are connected with the slides to drive them transversely of the body to move the cutters across the outer end face to perform the required cutting during rotation of the body about its axis.

9 Claims, 8 Drawing Figures

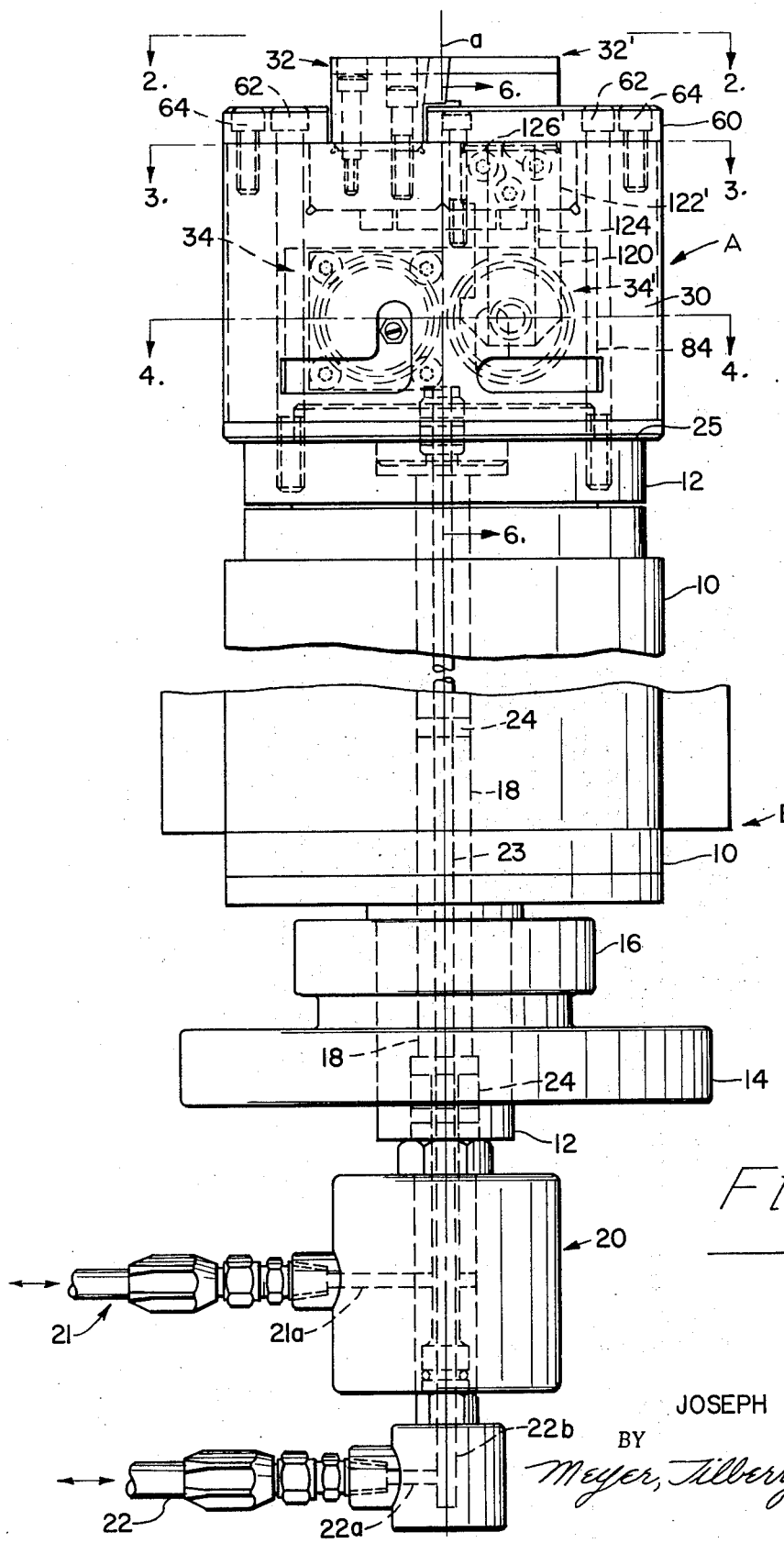

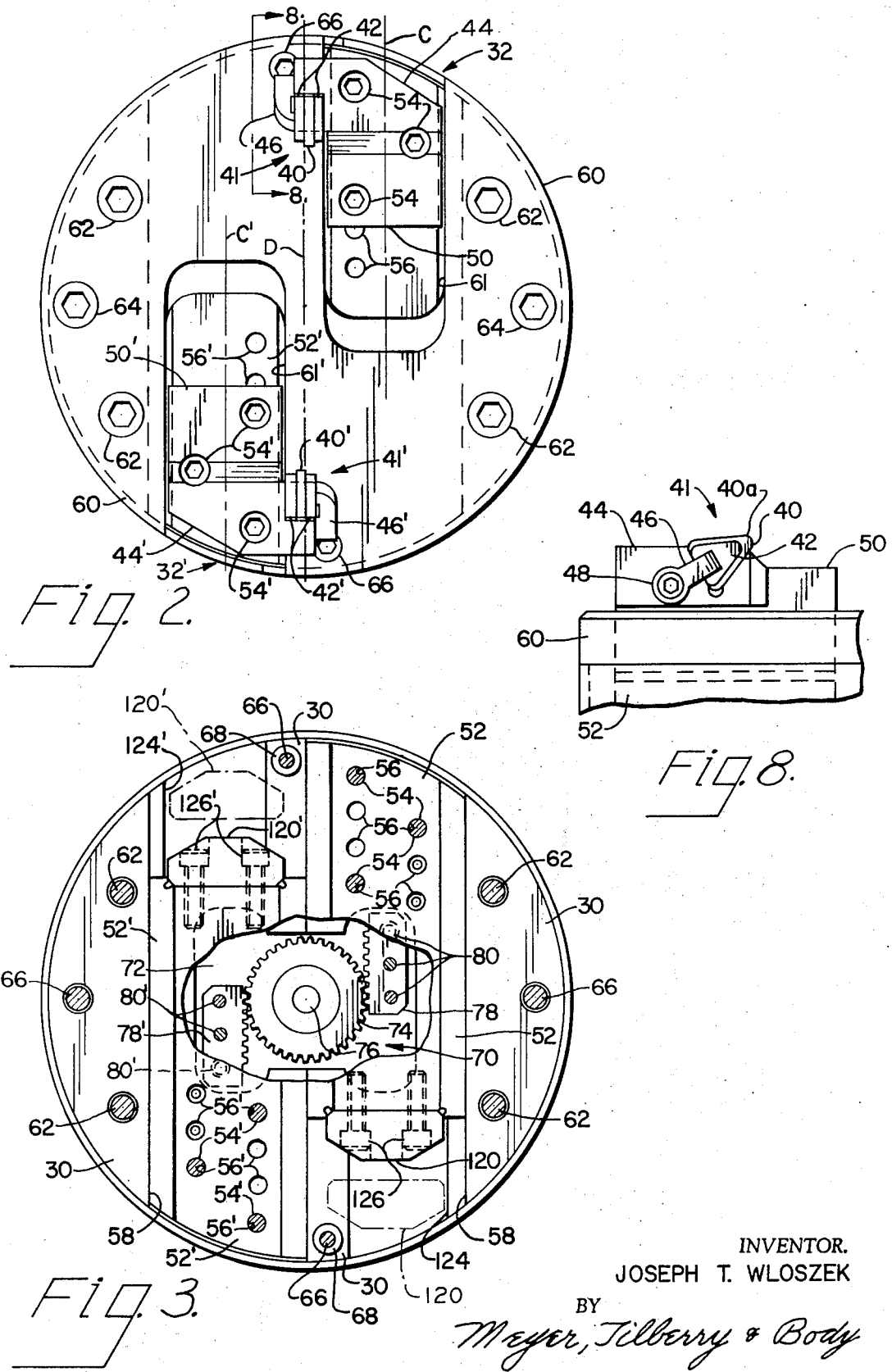

INVENTOR.
JOSEPH T. WLOSZEK
BY
Meyer, Tilberry & Body
ATTORNEYS.

CUTTING HEAD ASSEMBLY

This is a continuation of application Ser. No. 102,360 filed Dec. 29, 1970 now abandoned.

The present invention is directed toward the cutting art and, more particularly, to an improved rotary cutting head assembly.

The invention is especially suited for use on lathes or boring mills for performing facing operations and will be described with particular reference thereto; however, it should be appreciated that the invention is capable of broader application and could be utilized for performing a variety of boring, facing or machining operations.

In the cutting art it has been a relatively common practice to face the various surfaces of an irregular shaped workpiece by rigidly mounting the workpiece adjacent a cutting tool mounted in a tool carrier rotatable about an axis perpendicular to the surface to be faced. Means were provided for causing the cutting tool to be moved radially of the axis during rotation of the carrier. This caused an annular shaped portion of the surface to be machined or faced.

The major problem with this prior arrangement was the limitation of the maximum velocity at which the tool carrier could be rotated. As is apparent, because the tool was moved radially of the carrier's axis of rotation, the assembly could be dynamically balanced only at one point in the radial path of movement of the tool. At all other points in the tool's path of movement the assembly was dynamically unbalanced. Because of the unbalance, vibrations were set up. Only by making the carrier extremely rigid and rotating it at relatively low speeds could the vibrations be prevented from becoming excessive and producing an unsatisfactory machined surface. Additionally, because the speed of rotation of the carrier was thus limited, it was difficult to produce an extremely smooth surface on certain types of materials which require a high relative speed between the tool and the workpiece.

The present invention provides a cutting head assembly that overcomes the above problems and which can be rotated at substantially any desirable speed without noticable vibration. Because of the arrangement of the assembly it can never become dynamically unbalanced during operation. Further, because the assembly can be safely rotated at extremely high speeds (e.g. in the range of 45,000 rpm's and higher) highly polished machine surfaces can be obtained. For example, "16 microfinish" surfaces have been produced on ordinary cast iron.

In accordance with the present invention a cutting head assembly is provided which includes a tool carrier in the form of a generally cylindrical body having a central axis and terminating in opposed generally parallel end faces. The body is adapted to be rotated about its central axis and has a pair of cutting tool supports carried in one of its end faces. The tool supports are arranged for movement across the end face along parallel chordal lines. Means drivingly interconnect the tool supports for causing movement of one of the supports to produce equal and opposite movement of the other support; and, power means are provided for applying a force to the supports for moving them during rotation of the body.

By providing a pair of cutting tool supports arranged as described and drivingly interconnected so as to have equal and opposite movement radially of the axis of rotation of the carrier, the assembly is always dynamically balanced. Dynamic balance is assured irrespective of the speed of rotation of the carrier or the distance the supports are from the axis of rotation.

Accordingly, a primary object of the present invention is the provision of a rotary type cutting head assembly capable of performing facing operations at high speed without vibration.

A further object is the provision of a rotary type cutting head assembly which has a pair of cutters arranged for simultaneous radial movement equal in amounts of opposite directions.

A still further object of the invention is the provision of a rotary type cutting head assembly which is dynamically balanced throughout all stages of operation and is especially suited for facing operations.

Another object is the provision of a rotary type cutting head assembly having a rotatably driven tool carrier carrying a pair of cutters which are hydraulically driven radially of the axis of rotation of the carrier.

Yet another object is the provision of a rotary type cutting head assembly which can be rotated at extremely high rates.

These and other objects and advantages will become apparent from the following description used to illustrate a preferred embodiment of the invention when read in conjunction with the accompanying drawings wherein:

FIG. 1 is a plan view of the facing machine having a rotary cutting head assembly formed in accordance with the present invention;

FIG. 2 is a view taken on line 2—2 of FIG. 1 and showing the end face of the improved cutting head assembly;

FIG. 3 is a cross-sectional view taken on line 3—3 of FIG. 1.

FIG. 8 is an enlarged cross-sectional view taken on line 8—8 and showing the manner in which the cutting tools are mounted in the cutting head assembly.

Figure 4:
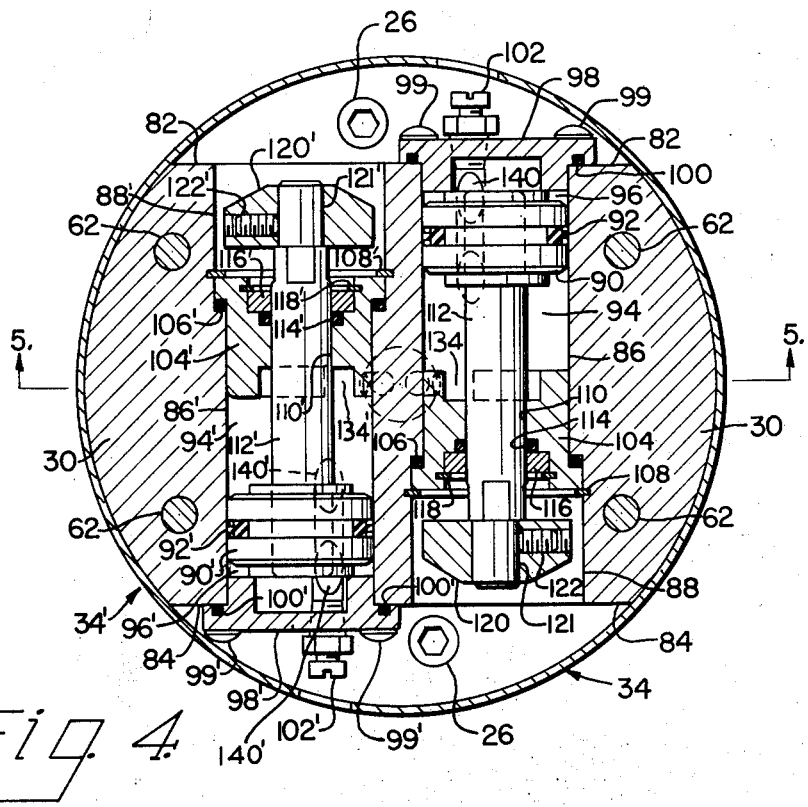
FIG. 4 is a cross-sectional view taken on line 4—4 of FIG. 1 and showing the actuating means utilized for moving the tool supports transversely of the cutting head.

Referring now to the drawings wherein the showings are for the purpose of illustrating a preferred embodiment of the invention only and not for the purpose of limiting same, FIG. 1 shows the overall arrangement of an improved cutting head assembly A mounted for rotation about a horizontal axis on a conventional spindle assembly B. The cutting head assembly A is arranged so that as it is rotated a pair of cutting tools carried in the outer face (the upper end as viewed in FIG. 1) are moved simultaneously at equal velocity in opposite directions chordally of the face to perform a facing operation on a workpiece positioned adjacent the cutting head.

Spindle assembly B is a conventional spindle assembly and forms no part of the present invention. However, as shown, the assembly B includes a stationary main support housing 10 which is preferably positioned so as to be adjustable in a direction along axis a. Extending longitudinally through the center of the housing and rotatably mounted in suitable bearings, not shown, is a spindle 12. A pair of pulleys 14 and 16 are mounted on the inner end of the spindle and provide means for driving the spindle and cutting head assembly A about axis a.

A bore 18 extends axially throughout the length of the spindle 12 and is connected through a conventional swivel connection 20 with a pair of hydraulic fluid lines 21 and 22. Lines 21 and 22 provide the necessary hydraulic fluid to control the motion of the cutting tools across the face of the cutting head assembly. As shown, line 22 is connected by passages 22A and 22B with a line 23 which extends axially through bore 18. Line 23 is supported in bore 18 by a plurality of spacers 24. Line 21 is connected through a passage 21A with bore 18 so that the fluid supply through line 21 flows in an annular path about line 23 to the outer end of the spindle.

Figure 6:
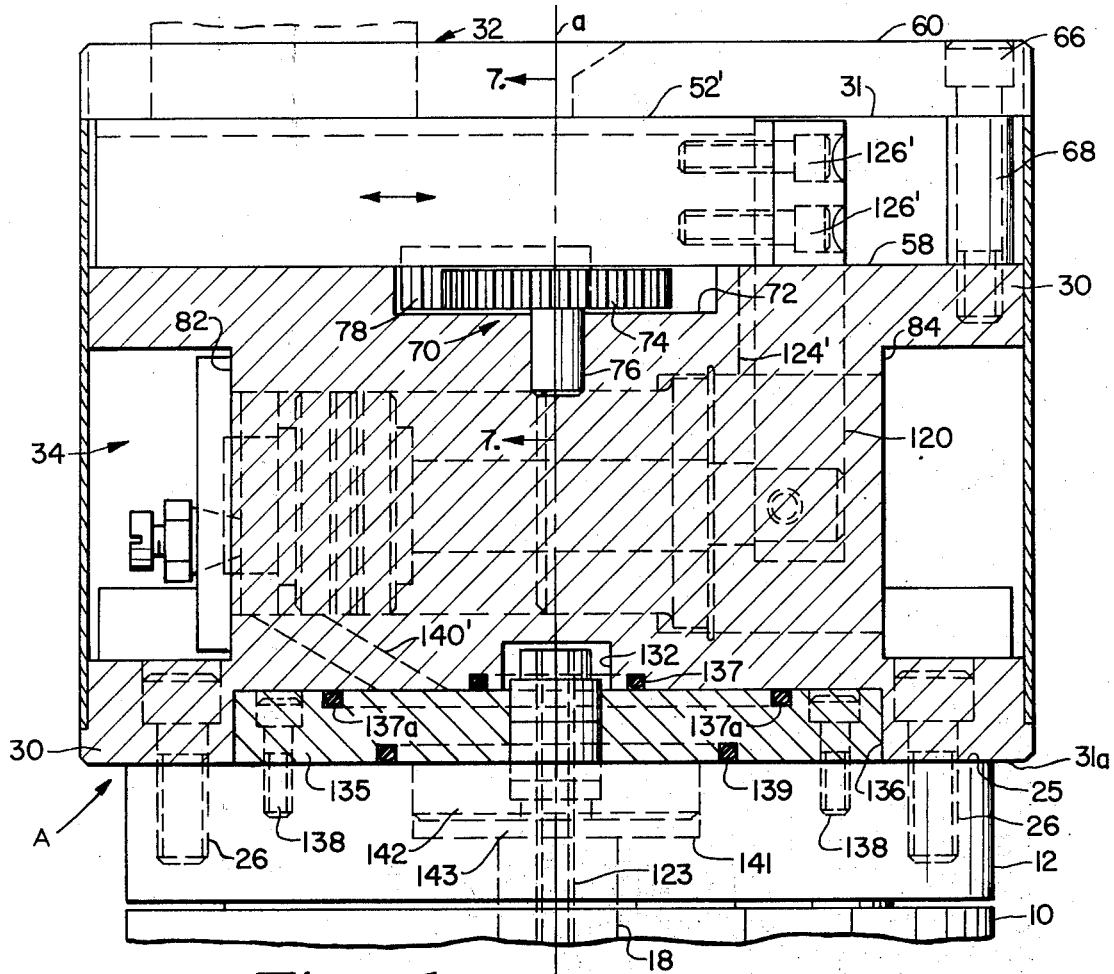
FIG. 6 is a cross-sectional view taken on line 6—6 of FIG. 1.

Referring specifically to FIG. 6, it is seen that cutting head assembly A includes a tool carrier in the form of a generally cylindrical body 30 having a central axis and terminating in end faces 31 and 31a. The body is positively connected to the outer transverse face 25 of spindle 12 by a plurality of screws 26. Carried in the outer transverse face 31 of body 30 are a pair of tool support units 32 and 32' (see FIG. 2). Tool support units 32 and 32' are arranged so as to be movable across the face along parallel chordal lines C and C' which are equally spaced on opposite sides of axis a. The support units 32 and 32' are driven in opposite directions by a pair of hydraulic power units 34 and 34' (see FIG. 4) and means, which will subsequently be described in detail, drivingly interconnect the units so that their movement is of equal velocity but in opposite directions.

Each of the support units 32 and 32' is of identical construction, as are their respective hydraulic power units 34 and 34'; consequently, like reference numerals deferentiated only by the addition of a prime (') suffix have been utilized to denote the same element in each respective unit. Accordingly, a description of one element is to be considered as applicable to its counterpart element unless otherwise noted.

Referring specifically to FIGS. 2 and 8, it is seen that tool support unit 32 carries a conventional triangular shaped cutter element 40 positioned so as to present an outwardly extending cutting edge 40A. Cutter 40 is mounted in a tool holder 41 which includes a pair of spacer blocks 42 mounted in a tool support block 44 by a clamp arm 46 connected to support block 44 by a socket screw 48. As shown, tool support block 44 is in turn carried by a support block 50 connected to a slide member 52. Support blocks 44 and 50 are connected to slide 52 by three socket screws 54 which extend vertically downwardly through the support blocks into threaded openings 56 formed in slide 52. As best seen in FIG. 3, a plurality of the openings 56 are provided so that the position of support blocks 50 and 44 and, consequently, the position of cutter 40 can be varied longitudinally of the slide.

The foregoing description is equally applicable to cutter unit 32'. Accordingly, the arrangement thus far described provides a pair of cutters 40 and 40' arranged for movement in a common plane along a diameter D of cutting head assembly A.

Figure 7:
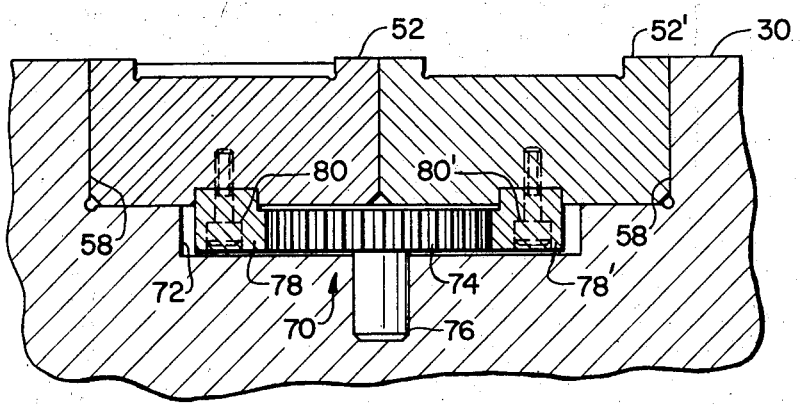
FIG. 7 is a cross-sectional view taken on line 7—7 of FIG. 6.

Referring to FIGS. 3, 6, 7, it is seen that slides 52 and 52' are carried in side-by-side relationship in a diagonally extending groove or guideway 58 formed in the outer face of body 30. The slides 52 and 52' are retained in groove 58 but permitted to have free sliding movement therein by a retainer plate 60 which extends across the top surface of the slides and is connected by a plurality of socket screws 62 and 64 to body 30. As shown, a pair of openings 61 and 61' extend inwardly from the outer periphery of retainer plate 60 and permit the tool support blocks 44 and 50 to extend outwardly through the retainer plate 60. Additionally, openings 61 and 61' are of a length sufficient to permit the slides and support blocks to have a substantial amount of freedom of movement along their respective chordal lines of movement C and C'.

As shown in FIGS. 1 and 6, screws 64 extend only a short distance into the outer end of body 30, while screws 62 extend completely through the body and provide additional connection between the cutting head assembly and the end face 25 of spindle 12. Additionally, screws 66 extend downwardly through groove or guideway 58 into connection with body 30. A spacer 68 is positioned about the shank of each screw 66.

As is apparent, with the cutter head assembly rotating at a substantial number of rpm's, severe vibrations will be set up unless it is dynamically balanced at all times and the cutter units moved exactly simultaneously an equal amount in opposite directions. Additionally, unless the cutter units are moved precisely the same amount one or the other of cutters 40 and 40' will not perform any cutting action since it will be moving into a space already cut by the other cutter. For this reason, tool support units 32 and 32' are drivingly interconnected mechanically so that they must move exactly simultaneously an equal amount in opposite directions.

Although a variety of means could be utilized for interconnecting the units, the preferred means include a rack and pinion gear arrangement best shown in FIGS. 3 and 7. As can be seen in FIG. 3, an axially extending recess 72 is formed centrally in the bottom of the groove or guideway 58. A pinion gear 74 is rotatably carried on a shift 76 which extends axially into body 30. Rack gears 78 and 78' are positively connected to the bottom surfaces of slides 52 and 52', respectively, by a plurality of socket screws 80 and 80'. As is apparent, this arrangement assures that movement of one of the cutter units produces or requires a corresponding movement of the other support unit in an opposite direction. Consequently, it is never possible for the cutting head assembly to be dynamically unbalanced because of non-uniform movement of the support units. Additionally, after the cutters 40 and 40' are properly set up and arranged relative to the workpiece, the driving interconnection between the cutter units assures that the movement of each of the cutters will be precisely the same, and thus, assures that each cutter will perform properly.

A variety of power means could be utilized for producing the required transverse movement of the support units during rotation of the carrier; however, according to the preferred embodiment the means utilized comprise a pair of hydraulic power units 34 and 34'. As best shown in FIGS. 1 and 4, a pair of parallelly extending flats 82 and 84 are formed inwardly from opposite sides of body 30. Bores 86 and 86' extend inwardly from flats 82 and 84, respectively. Bores 86 and 86' are positioned parallel and an equal distance on opposite sides of the axis of the body 30. The innermost ends of bores 86 and 86' are connected with the opposite flat 84 and 82 respectively, by slightly larger bores 88 and 88', respectively.

Slidingly positioned within bore 86 is a piston 90. Piston 90 is provided with a resilient piston ring 92 which functions to divide the interior of bore 86 into two relatively sealed chambers 94 and 96. The outer end of chamber 96 is sealed by a cover plate 98 connected to body 30 by a plurality of screws 99. An O-ring 100 functions to provide a fluid seal between the cover plate and the body 30, and an air vent valve 102 is mounted in the end of cover plate 98 to allow air to be vented from the chamber 96. The outer end of chamber 94 is similarly sealed by a member 104 and an O-ring 106 which are retained in position by a snap ring 108 fitted in a groove formed in a bore 8. A bore or opening 110 extends through member 104 and receives a piston rod 112 which is connected with piston 90 and extends outwardly through the bore. Piston rod 112 is sealed where it passes through bore 110 by an O-ring 114 which is maintained in position by a cylindrical retainer member 116 held in member 104 by a snap ring 118.

It is to be understood that hydraulic power unit 34' is constructed in a manner identical to that described with respect to power unit 34; however, the power unit 34' is arranged so that its piston rod 112' extends in a direction directly opposite to piston rod 112. In this manner, so long as the pistons are constrained to move equally in opposite directions, no dynamic unbalance will be produced by their movement.

A variety of means could be utilized for drivingly connecting the ends of piston rods 112 and 112' with their respective slide member 52 and 52'. However, preferably the means comprise an arm 120 best shown in FIGS. 1, 4 and 6. One end of arm 120 is provided with an opening which receives the reduced end portion 121 of piston rod 112. The arm is positively connected to the piston rod in any convenient manner such as, for example, a set screw 122. As shown in FIGS. 1 and 6, the arms 120 and 120' extend upwardly through recesses 124 and 124' which are formed inwardly from the outer surface of member 30. The upper ends of arms 120 and 120' are connected to the ends of their respective slide members 52 and 52' by a plurality of socket screws 126 and 126'.

As is apparent, by the selective application of hydraulic fluid to chambers 96, 96' or chambers 94, 94', the slides 52, 52' are caused to move transversely of the cutting head and move the cutters 40 and 40' in a corresponding amount. Because of the positive pinion gear drive connection between the slides 52 and 52' the movement of the pistons 92 and 92', as well as the tool supports and cutting tools, must be exactly equal and in opposite directions.

Figure 5:
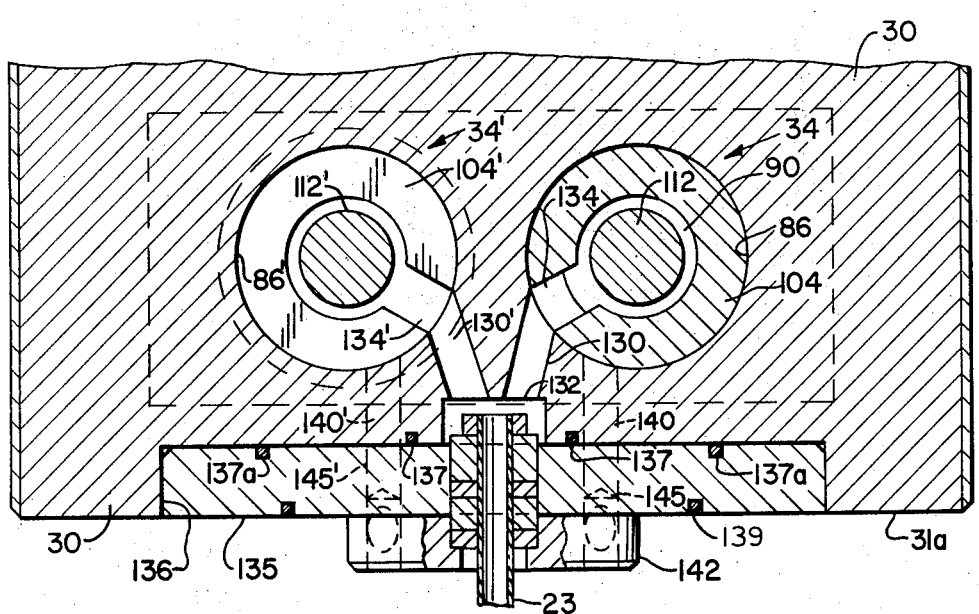
FIG. 5 is a cross-sectional view taken on line 5—5 of FIG. 4.

Means for supplying hydraulic fluid to chamber 94, 94' during rotation of the assembly include openings 130 and 130' which extend inwardly from a recess 132 formed in a large diameter recess 136 formed in the lower face 31a of body 30 (see FIG. 5). The outer opening of recess 132 is closed by a adaptor plate 135 which is received in recess 136. A pair of O-rings 137 and 137a serve to provide a seal between recess 132 and the spindle 12. As shown, O-ring 137a is carried in adaptor plate 135 while O-ring 137 is carried in the bottom of recess 136. Adaptor plate 135 is connected to the end of spindle 12 by a plurality of screws 138 (see FIG. 6). Additionally, a O-ring 139 is positioned in the lower surface of adaptor plate 135 to provide a seal about a recess 141 formed in the end face of spindle 12. A member 142 extends from the lower face of adapter plate 135 into recess 141 and in combination therewith defines a chamber 143. Axial bore 18 opens to chamber 143 and is connected through openings 145 and 145' with lines 140 and 140' which pass through body 30 into chambers 96 and 96'.

Fluid is supplied to chambers 94 and 94' by line 23 which is communicated directly with chamber 132 which is in turn connected with chambers 94 and 94' by openings 130 and 130' extending through body 30.

As is apparent, by supplying fluid through either line 21 or 22 while the other line is permitted to discharge fluid, the cutter units 32 and 32' are caused to move across the outer face of the cutting head assembly to machine or face a workpiece positioned adjacent the head assembly. Because the movements of the slides and their drive pistons are exactly equal and in opposite directions, and because these elements are of identical construction and arranged symmetrically with respect to the central axis a of the unit, the unit is never dynamically unbalanced.

Cutter head assemblies formed in accordance with the present invention have been operated at speeds as high as 4,500 rpm's without any noticeable vibrations being developed. Consequently, by the use of the cutting head of the invention it has been possible to perform extremely high speed facing operations while producing a machined surface of extreme smoothness.

The invention has been described in great detail sufficient to enable one of ordinary skill in the cutting art to practice the same. Obviously, modifications and alterations of the preferred embodiment will occur to others upon a reading and understanding of the specification and it is my intention to include all such modifications and alterations as part of my invention insofar as they come within the scope of the appended claims.

I claim:
1. A rotary cutting head assembly having radially adjustable cutting tools disposed therein, said assembly comprising:
   a generally cylindrical tool carrier body having a longitudinal axis and a pair of spaced apart end faces disposed generally normal to said axis, said body being adapted to be rigidly affixed at one end face thereof to a conventional tool spindle assembly, a pair of cylinders in said body extending chordally on each side of said axis in generally parallel relationship with each other;
   a piston slideably received in each of said cylinders, said pistons each including a pair of generally opposed pressure surfaces;
   first means for introducing hydraulic power fluid into an opposite end of each cylinder for simultaneously driving said pistons in opposite chordal directions;
   second means for introducing hydraulic power fluid into the other opposite ends of each cylinder for simultaneously driving said pistons in opposite chordal directions;

a pair of slide members each operatively connected to one of said pistons, said slide members being slideably disposed in the other end face and simultaneously movable in opposite chordal directions responsive to movement of said pistons, said slide members each including means for retaining at least one tool member thereon in a desired working position extending outwardly of said other end face, whereby as said pistons are selectively moved between said first and second positions, said tool members are simultaneously moved so as to alter the effective cutting diameter thereof; and, means disposed in said carrier body between said slide members for equalizing relative movement between said slide members.

2. The cutting head assembly as defined in claim 1 further including a slide member guideway in said other end face extending chordally thereacross for receiving said guide members in a side-by-side sliding relationship, said carrier body further including means for maintaining said slide members in position in said guideway.

3. The cutting head assembly as defined in claim 2 wherein said retaining means are positionable at selected locations along the associated surface of said slide members.

4. The cutting head assembly as defined in claim 3 wherein said equalizing means comprises a rack gear on each of said slide members and a pinion gear pivotally supported on said carrier body and meshed with each of said rack gears.

5. The cutting head assembly as defined in claim 5 including an elongated piston rod extending outwardly from each of said pistons and means providing a hydraulic fluid seal between said piston and its associated cylinders for preventing intermixture of fluid introduced into said cylinders by said first and second introducing means, each slide member being operatively connected to its associated piston by a linkage member extending from adjacent the end of said piston rod remote from said piston to said slide member.

6. The cutting head assembly as defined in claim 5 wherein said maintaining means comprises a cover plate member disposed over said other end of said carrier body, said cover plate including openings for permitting at least said tool members to extend therethrough.

7. In a rotary cutting head assembly of the type having a tool carrier body including a longitudinal axis with at least a pair of cutting tools disposed on associated slide members so as to extend axially beyond one end face of said body and means for selectively simultaneously moving said slide members in a generally opposite but parallel chordal relationship across at least a portion of said one end face in order to adjust the effective cutting diameter of said tools, the improvement comprising:

a pair of elongated cylinders extending chordally through said body on each side of said axis in generally parallel relationship a piston in each of said cylinders, and having a pair of generally opposed pressure surfaces; first means for introducing hydraulic drive fluid into said cylinders against one of said pressure surfaces for selectively driving said pistons toward a first position adjacent one end of said chambers; second means for introducing hydraulic drive fluid into said cylinders against the other of said pressure surfaces on each piston for selectively driving said pistons toward a second position adjacent the other end of said cylinders; and, linkage means operatively interconnecting each of said pistons with its associated slide member in order to selectively effect translational movement of said slide members responsive to movement of said pistons.

8. The improvement as defined in claim 7 wherein each said linkage means includes an elongated piston rod extending outwardly from one of said pressure surfaces and means for providing a hydraulic fluid seal between said piston and its cylinder for preventing intermixture of the power fluid introduced thereinto by said first and second introducing means, said linkage means including a member extending from adjacent the end of each piston rod remote from said piston to the associated slide member.

9. The improvement as defined in claim 8 further including adjustable means for positioning said tools at selected locations on said slide members.

* * * * *